R. E. HELLMUND.
FIELD CONTROLLING MEANS FOR DYNAMO ELECTRIC MACHINES.
APPLICATION FILED DEC. 29, 1915.
1,315,957.
Patented Sept. 16, 1919.
3 SHEETS—SHEET 1.
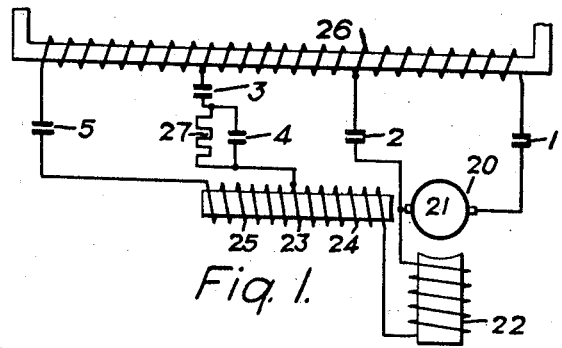
Fig. 1.
| Switches | 1 | 2 | 3 | 4 | 5 |
|---|---|---|---|---|---|
| Weak Field | o | o | | | o |
| Transition | o | o | o | | o |
| | o | o | o | | |
| Strong Field | o | o | o | o | |
Fig. 2.
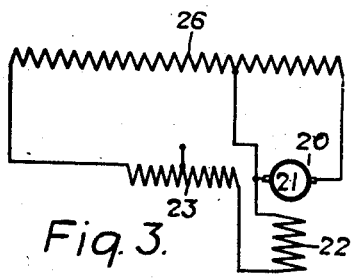
Fig. 3.
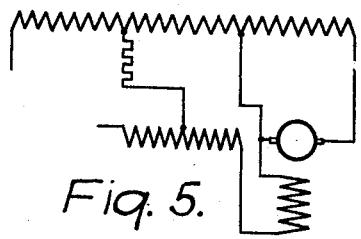
Fig. 5.
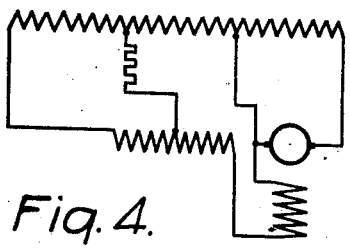
Fig. 4.
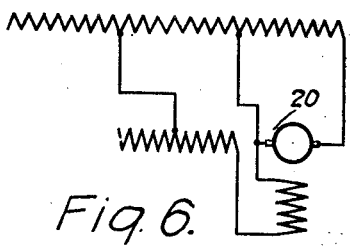
Fig. 6.
WITNESSES:
INVENTOR
Rudolf E. Hellmund.
BY
ATTORNEY R. E. HELLMUND.
FIELD CONTROLLING MEANS FOR DYNAMO ELECTRIC MACHINES.
APPLICATION FILED DEC. 29, 1915.
1,315,957.
Patented Sept. 16, 1919.
3 SHEETS—SHEET 2.
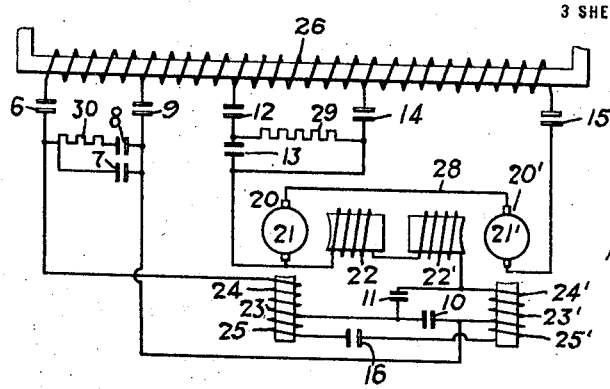
Fig. 7.
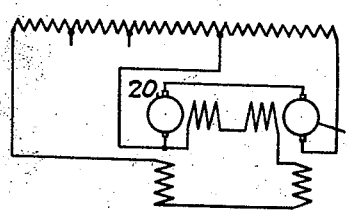
Fig. 9.
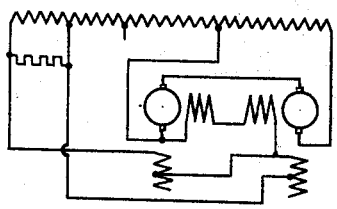
Fig. 13.
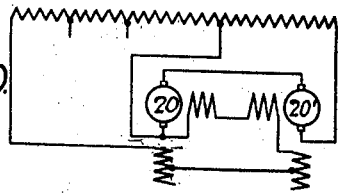
Fig. 10.
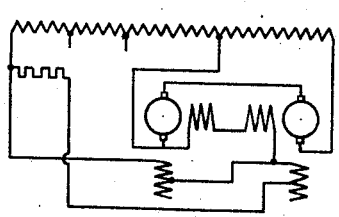
Fig. 14.
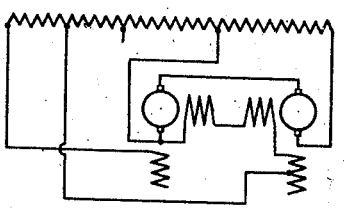
Fig. 11.
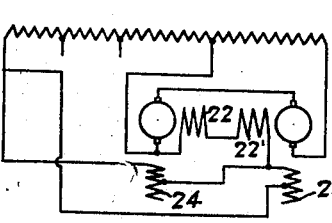
Fig. 15.
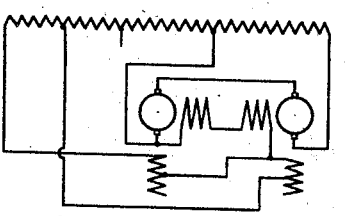
Fig. 12.
Fig. 16.
WITNESSES:
Fig. 8.
INVENTOR
Rudolf E. Hellmund
BY
ATTORNEY R. E. HELLMUND.
FIELD CONTROLLING MEANS FOR DYNAMO ELECTRIC MACHINES.
APPLICATION FILED DEC. 29, 1915.
1,315,957.
Patented Sept. 16, 1919.
3 SHEETS—SHEET 3.
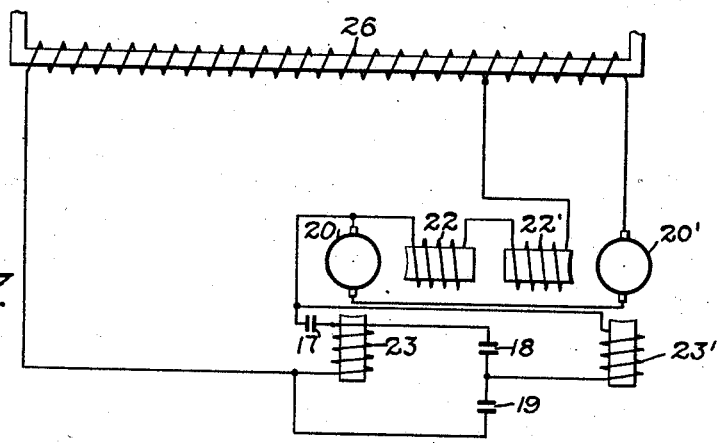
Fig. 17.
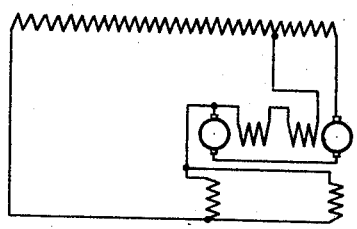
Fig. 18.
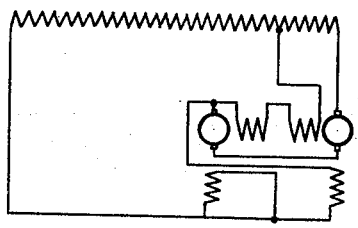
Fig. 20.
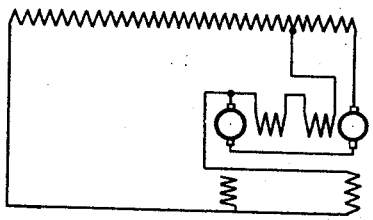
Fig. 19.
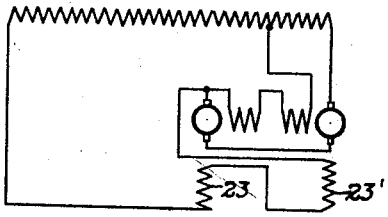
Fig. 21.
Fig. 22.
|  | 19 | 18 | 17 |
|---|---|---|---|
| Weak Field | O |  | O |
| Transition |  | O |  |
| Transition | O | O |  |
| Strong Field |  | O | O |
WITNESSES:
R. J. Cadye.
J. C. Davis.
INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

FIELD-CONTROLLING MEANS FOR DYNAMO-ELECTRIC MACHINES.

1,315,957.   Specification of Letters Patent.   Patented Sept. 16, 1919.

Application filed December 29, 1915. Serial No. 69,188.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Field-Controlling Means for Dynamo-Electric Machines, of which the following is a specification.

My invention relates to field-controlling means for dynamo-electric machines being more particularly adapted for use with alternating-current motors of the compensated, commutator type, and it has for its object to provide a system wherein the strength of the main or exciting field may be so controlled as to insure good commutation under various conditions of speed and of load.

In the accompanying drawing, Figure 1 is a diagrammatic view of an alternating-current motor of the compensated, commutator type, together with its attendant supply and control circuits, embodying a preferred form of my invention; Fig. 2 is a sequence chart illustrating the order of switch manipulation employed in the system of Fig. 1; Figs. 3 to 6, inclusive, are simplified diagrammatic views illustrating the development of connections in Fig. 1 in accordance with the switch sequence of Fig. 2; Fig. 7 is a diagrammatic view of a pair of alternating-current motors of the above-mentioned type, together with their attendant control and supply circuits, embodying a modification of the invention disclosed in Fig. 1; Fig. 8 is a sequence chart illustrating the method of switch operation in the system of Fig. 7; Figs. 9 to 16, inclusive, are simplified diagrammatic views setting forth the development of the connections in the system of Fig. 7 in accordance with the switch sequence of Fig. 8; Fig. 17 is a diagrammatic view of a modification of the system shown in Fig. 7; Figs. 18 to 21, inclusive, are simplified diagrammatic views illustrating the field manipulation employed in the system shown in Fig. 17; and Fig. 22 is a sequence chart illustrating the method of switch operation in the system of Fig. 17.

It is well known, in the operation of motors of the commutator type at low speeds and particularly with heavy loads, that the main or exciting field winding generates an excessive transformer electromotive-force in the short-circuited coils undergoing commutation and hence produces excessive sparking. Various systems have been proposed for remedying this defect by special field-weakening connections in the main field winding but such connections are not desirable because a total or partial short circuit of the winding portion to be eliminated during the transition practically eliminates the field for the time being and with it the motor torque. Similar difficulties are experienced when the field windings are reconnected from series to parallel for the purpose of weakening the field.

By my invention, I cause the current in the exciting field winding to be dependent upon that in a cross-field winding and I then adjust the current in the cross-field winding by alternating the ratio of transformation between the same and the armature winding, whereby a simple and effective control of the exciting field is obtained. Furthermore, I may cause the current in an exciting field winding to be dependent upon that in a plurality of cross-field windings and I may alter the connections between said cross-field windings to obtain a like result.

Referring to the drawing for a more detailed understanding of my invention, I show an alternating-current motor of the compensated, commutator type at 20 in Fig. 1. The motor 20 is provided with an armature 21, an exciting field winding 22 and a cross field winding 23, the latter being divided into two portions 24 and 25. Current may be supplied to said motor from a source 26 and suitably manipulated and modified by means of control switches 1 to 5, inclusive, and of a preventive resistance member 27.

In operating the motor 20, it is at first desirable that the field winding 22 have weak excitation and, accordingly, the switches 1, 2 and 5 are closed, as indicated in the first position of Fig. 2, and the connections of Fig. 3 are thereby established. The motor is connected for doubly-fed operation, the entire cross field winding 23 being connected across a portion of the source 26 in series with the winding 22 and the armature 21 being connected across the remainder of the source. The inclusion of all the turns of the cross field winding results in a high ratio of transformation between the field winding 23 and the armature 21, with resultant small current flow in the winding 23. As the winding 22 is connected in series therewith, there results a small current flow therein and the desired weak exciting field for starting is obtained. For transition to the condition of strong excitation for the field winding 22, the switches are manipulated, as shown in the last three steps of the chart 2 and as illustrated in Figs. 4, 5 and 6, whereby the portion 25 of the cross-field winding 23 is eliminated from the circuit and, at the same time, the total motor voltage is reduced. Abrupt voltage changes are obviated by appropriate use of the preventive device 27, as is well known in the art. In the final connection shown in Fig. 6, the elimination of the portion 25 of the cross field 23 results in a reduction of the ratio of transformation between the cross field winding and the armature winding with a consequent increase in the cross-field current and, therefore, in the exciting field strength. The motor 20 may subsequently be further accelerated in accordance with any of the well known systems.

Referring to the form of my invention shown in Fig. 7, two alternating-current motors of the compensated, commutator type are shown at 20 and 20', respectively. The motor 20 comprises an armature 21, an exciting field winding 22 and a split cross field winding 23, and, in like manner, the motor 20' comprises an armature 21', an exciting field winding 22' and a split cross field winding 23'. One brush of the motor 20' may be connected to the right hand terminal of a source 26 through a switch 15. The remaining brush of the motor 21' is permanently connected to one brush of the motor 20 by a lead 28. The remaining brush of the motor 20 may be connected to an intermediate point of the source 26 by suitable manipulation of mid-tap connection switches 12, 13 and 14 and of a preventive device 29, and said last-named brush of the motor 20 may also be connected through the exciting field winding 22 and 22' and through adjustable portions of the cross field windings 23 and 23' to the left-hand portion of the source 26, through suitable outer tap switches 6, 7, 8 and 9 of a preventive device 30. The outer portions 25 and 25' of the outer field windings 23 and 23' may be included in circuit by closing a suitable switch 16 or may be excluded from the circuit by closing a suitable switch 10 and opening the switch 16.

In operating the motors 20 and 20' the switches 6, 14, 15 and 16 are first closed, as shown in accelerating position A in Fig. 8 and as indicated in Fig. 9. The motors 20 and 20' are connected for doubly-fed operation with the exciting windings thereof in series with all turns of the cross field windings as in the first or weak field connection of Fig. 1. The switch 16 is then opened and the switch 10 closed, whereupon the connections shown in Fig. 10 are established, the motors 20 and 20' being still connected for double-fed operation but a portion of the cross-field windings being eliminated, thereby strengthening the exciting fields.

It will be noted that, in the connections of both Fig. 9 and Fig. 10, the cross field windings of the two motors are in series with each other and with the two exciting field windings, whereby each of the exciting field windings of the two motors receives the cross-field current of one motor. By gradual transition as indicated in Figs. 11, 12, 13, 14 and 15, the main portions 24 and 24' of the cross-field windings are now changed from series relationship to each other to parallel relationship but all the cross-field current is still supplied to the exciting field windings 22 and 22' in series. It is thus seen that either exciting field winding is supplied with the cross field current of both motors and hence a still further strengthening of the exciting field is produced with proper control of sparking. In the final position shown in Fig. 16, the voltage on the intermediate tap is raised for acceleration.

I may, if desired, energize the exciting field windings by the difference between the armature and the cross field currents and by then altering the strength of the cross-field winding, proper changes may be brought about in the strength of the exciting fields. A system of this character is shown in Fig. 17 wherein motors 20 and 20' provided with exciting and cross-field windings, as in the previous figures, are connected to be energized from a source 26 for doubly-fed operation, the exciting field windings 22 and 22' being inserted in the intermediate tap of the doubly-fed connection rather than being in series with the cross-field windings. The cross-field windings being provided with a different number of turns than the armature windings, as is usual in the art, a different current flows in the armature than flows in the cross-field windings, and the differential current finds its way either to or from the source 26 through the intermediate tap and thus through the exciting field windings 22 and 22'.

It being usual to provide the cross field winding with more turns than the armature windings, the normal current flow therein is less than in the armature windings and the current for the energization of the exciting field windings flows through the armatures. It is therefore desirable, for the weakening of the exciting fields during starting, to increase the total cross-field current and the cross-field windings are at first connected in parallel as shown in Fig. 18. By passing through suitable transition connections 19 and 20, the cross-field windings 23 and 23' are next connected in series as shown in Fig. 21. The total cross-field current is thus reduced in amount and being inherently less than the armature current, the difference between the same and the armature current is thereby increased and the exciting field current is increased, as is desired.

While I have shown my invention in its preferred forms, it will be obvious to those skilled in the art that various minor changes and modifications may be made without departing from the spirit thereof and I desire, therefore, that only such limitations shall be placed thereupon as are imposed by the prior art or are indicated in the appended claims.

I claim as my invention:

1. The combination with an alternating-current commutator motor comprising an armature, an exciting winding and an inducing winding, of a sourse of energy, means for varying the current in said inducing winding both by varying the voltage applied to the armature and by varying the effective turns of the inducing field winding, and means for causing the current flowing in said exciting winding to vary in accordance with the current in said inducing winding.

2. The combination with a plurality of alternating-current motors of the compensated type provided with interconnected inducing field windings, armatures, and exciting field windings, of means for varying the grouping of said inducing windings, means for impressing an adjustable E. M. F. on the armature and means for varying the current supplied to the exciting field windings in accordance with the net current flowing in all of the inducing windings.

3. The combination with a plurality of alternating-current motors of the compensated type provided with interconnected inducing field windings, armatures, and exciting field windings, of means for connecting the inducing windings of the different machines in either series or parallel relation to each other, means for supplying the total resultant inducing field current to each of the exciting field windings, and means for impressing an adjustable E. M. F. on the armature.

4. The combination with a plurality of alternating-current motors of the compensated type provided with interconnected inducing field windings, of means for varying the ratio of transformation between the armature and inducing field windings in said machines, means for impressing an adjustable E. M. F. on the armature, means for connecting the inducing field windings of the different machines in series or parallel relation to each other, and means for supplying the total resultant inducing field current to each of the exciting field windings.

5. The combination with a plurality of alternating-current motors of the compensated type provided with interconnected inducing-field windings, exciting windings, and armatures, of means for connecting all of the inducing-field windings in series with a high ratio of transformation between each inducing-field winding and its associated armature winding and for supplying the resultant inducing-field current to the exciting field windings for starting, means for then increasing the exciting field current in each machine by lowering said ratio of transformation, means for still further increasing said exciting field current by connecting said inducing-field windings in parallel with each other, and means for varying the voltage applied to the load circuit of the armature.

6. The combination with a plurality of alternating-current motors provided with interconnected inducing field windings, armatures, and exciting field windings, of a source of energy, means for establishing from said source two circuits, one comprising the inducing field windings and the other comprising the armatures, and for impressing upon each of the circuits a voltage from said source, means for varying the connections of said inducing field windings so as to change the relative values of working current derived by the two circuits from said source, and connections whereby the current supplied to the exciting field windings varies in accordance with both the load of the motor and the change in the ratio of the currents in the two circuits.

7. The combination with an alternating-current motor of the commutator type provided with an inducing field winding, an armature and an exciting field winding, of a source of energy, means for establishing two circuits from said source one comprising the armature and the other comprising the inducing field winding, means for varying the effective number of turns of said inducing field winding so as to change the relative values of working current derived by the two circuits from said source, and connections whereby the current supplied to the exciting field winding varies in accordance with both the load of the motor and the changes in the ratio of the currents in the two circuits.

In testimony whereof, I have hereunto subscribed my name this 22nd day of Dec., 1915.

RUDOLF E. HELLMUND.

Copies of this patent may be obtained for five cents each, by addressing the "Commissioner of Patents, Washington, D. C."